March 8, 1938.  J. R. REYBURN  2,110,474
CHAIN WITH REINFORCED LINKS
Filed March 7, 1936
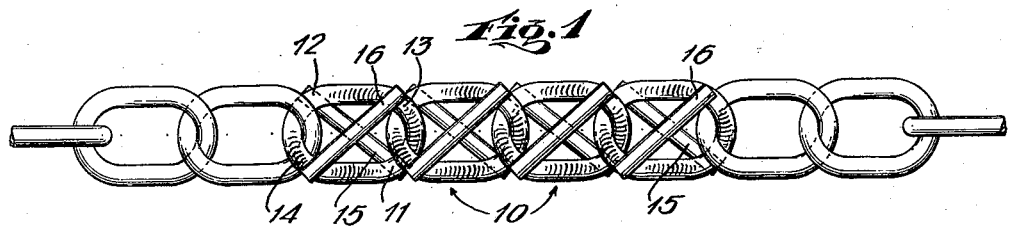
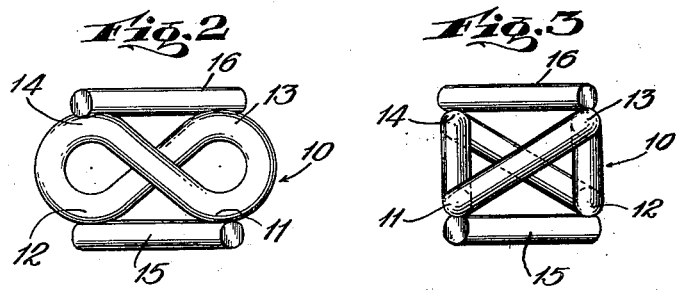 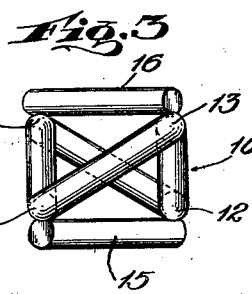
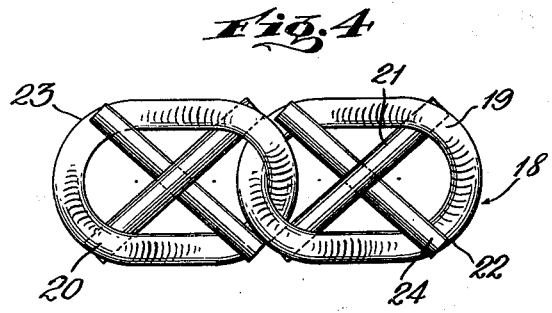
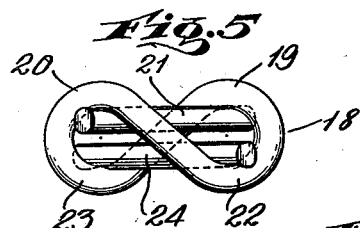
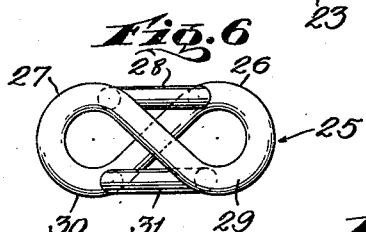 
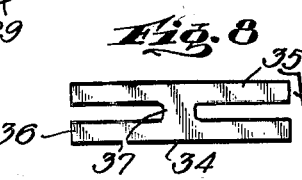
INVENTOR
JOHN R. REYBURN
BY
ATTORNEY Patented Mar. 8, 1938

2,110,474

UNITED STATES PATENT OFFICE 2,110,474

CHAIN WITH REINFORCED LINKS

John R. Reyburn, Fairfield, Conn., assignor to American Chain & Cable Company, Inc., a corporation of New York Application March 7, 1936, Serial No. 67,571

9 Claims. (Cl. 152—14)

The present invention relates to chains of the twisted link type such, for example, as are commonly used to form the tread members of antiskid tire chains.

An object of the present invention is to reinforce such twisted links so as to prevent them from flattening under compressive forces.

A more specific object of the invention is to provide the links of the chain with reinforcing bars that are disposed diagonally to each other, such bars being welded to opposite points of the link so as to tie such points together and prevent them from spreading apart.

A further object of the invention is to provide a link thus reinforced in which the reinforcement is applied symmetrically with respect to opposite faces of the link so that the link or chain of links is reversible.

Another object of the invention is to apply the reinforcements in such a way that they will serve as calks to increase traction of the links.

Other objects and advantages of the invention will appear in the following description of certain embodiments thereof and thereafter the novelty and scope of the invention will be pointed out in the claims.

In the accompanying drawing:

Figure 1 is a plan view of a chain including a member of my improved reinforced links;

Fig. 2 is a side view of one of the reinforced links;

Fig. 3 is an end view of the link shown in Fig. 2;

Fig. 4 is a plan view of a pair of reinforced links of somewhat different construction;

Fig. 5 is a view of one of the side links shown in Fig. 4;

Fig. 6 is a side view of another form of reinforced link;

Fig. 7 is a side view of still another form of reinforced link; and

Fig. 8 is a view in side elevation of a reinforcement blank used in making the link shown in Fig. 7.

The chain shown in Fig. 1 comprises a series of inter-linked twisted links 10, of the type commonly known as curb links. Each of these links comprises a closed wire loop with the ends of the loop twisted in opposite directions, so that as viewed from the side (see Fig. 2) the link appears to take the form of the figure 8. Such a link laid upon a flat surface would rest upon the two diagonally opposite lower lobes 11 and 12. The link also has a pair of upper diagonally opposite lobes 13 and 14. The lower lobes lie in a vertical plane that intersects the vertical plane of the upper lobes substantially at the middle of the link.

It will be evident that if subjected to vertical pressure the link will tend to flatten by spreading of lobe 11 from lobe 12 and of lobe 13 from lobe 14. The link will be greatly strengthened by tying these lobes together so that they cannot spread apart. To this end, I provide a bar 15 connecting lobes 11 and 12 and another bar 16 connecting lobes 13 and 14. The bars are welded to the lobes and by tying the lobes together greatly strengthen the link and prevent flattening of the same.

In the link shown in Figs. 1 to 3 the bars are welded to the outer or convex surface of the lobes so that they serve as calks to press into the tire on the inner side of the cross chain and dig into the road on the outer side of the chain. It will be observed that the chain will be reversible since either side may be used as a road engaging surface. The diagonally disposed cross bars 15 and 16 limit the play of interengaging links and prevent kinking and tangling of the chain.

Where it is desirable to reinforce the links without forming cleats or calks thereon, the reinforcing bars may be applied to the inner or concave surface of the lobes. Such an arrangement is shown in Figs. 4 and 5. Here the links 18 are of the same general form as the links 10, but the diagonally opposed lobes 19 and 20 of each link are connected by a bar 21 which is welded to the under or concave face of the lobes, while the two other diagonally opposed lobes 22 and 23 are connected by a bar 24 welded to the concave side of the latter lobes. These links thus reinforced are fully as strong as the links 10. In this construction, the play of interlinked loops is even further limited than in the construction shown in Figs. 1 to 3 inclusive.

Fig. 6 shows another link 25 of the same general form as links 10 and 18, but in which diagonally opposite lobes 26 and 27 are connected by a bar 28 that abuts the lateral faces of these lobes. Similarly, diagonally opposite lobes 29 and 30 are connected by a bar 31 that abuts the lateral faces of the latter lobes. The bars 28 and 31 are welded to the lobes so that the lobes are thus firmly tied together, but the bars do not project from the link in such a way as to serve as calks.

In Fig. 7, I show another link 32 which is similar in general to the link shown in Fig. 5. The difference in this case being that instead of employing two separate bars to connect the lobes I use a single reinforcement member 34 which, as shown in Fig. 8, may be stamped out of sheet metal. This reinforcement is originally in the form of the letter H having two legs 35 and 36 integrally connected by a web 37 at a median point. In applying this reinforcement to the web 37 is twisted so that the reinforcement takes the form of the letter X. The leg 35 then connects diagonally opposed lobes 41 and 42, while the leg 36 connects the diagonally opposed lobes 43 and 44. The legs of the reinforcement bear against the concave face of the respective lobes and are welded thereto. This produces a much stronger link than that shown in Fig. 5.

While I have described certain embodiments of my invention it will be understood that these are to be taken as illustrative and not limitative and that I reserve the right to make various changes in form and construction of parts without departing from the spirit and scope of my invention as pointed out in the following claims.

I claim:

1. A chain link comprising a closed wire loop with the ends thereof oppositely twisted to form a pair of diagonally opposed depressed lobes and a pair of diagonally opposed elevated lobes, and a bar welded to and connecting each pair of lobes to prevent them from spreading apart, the bars being vertically spaced apart so that their points of connection with the lobes will lie in widely spaced parallel planes.

2. A chain link comprising a closed wire loop with the ends thereof oppositely twisted to form a pair of diagonally opposed depressed lobes and a pair of diagonally opposed elevated lobes, and a bar welded to and connecting each pair of lobes to prevent them from spreading apart, the bars being integrally connected.

3. A chain link comprising a closed wire loop with the ends thereof oppositely twisted to form a pair of diagonally opposed depressed lobes and a pair of diagonally opposed elevated lobes, a bar welded to and connecting each pair of lobes to prevent them from spreading apart, and means connecting the bars together at a median point.

4. A chain link comprising a closed wire loop with the ends thereof oppositely twisted to form a pair of diagonally opposed depressed lobes and a pair of diagonally opposed elevated lobes, and a bar welded to and connecting each pair of lobes to prevent them from spreading apart, the bars being applied to the convex surfaces of the lobes to form calks on the chain link.

5. A chain link comprising a closed wire loop with the ends thereof oppositely twisted to form a pair of diagonally opposed depressed lobes and a pair of diagonally opposed elevated lobes, and a bar welded to and connecting each pair of lobes to prevent them from spreading apart, the bars being applied to the concave surfaces of the lobes.

6. A chain link comprising a closed wire loop with the ends thereof oppositely twisted to form a pair of diagonally opposed depressed lobes and a pair of diagonally opposed elevated lobes, and a bar welded to and connecting each pair of lobes to prevent them from spreading apart, the bars being applied to the concave surfaces of the lobes and being integrally connected to each other substantially at the center of the link.

7. A chain link comprising a closed wire loop with the ends thereof oppositely twisted to form a pair of diagonally opposed depressed lobes and a pair of diagonally opposed elevated lobes, and a sheet metal reinforcement comprising two bars and a web connecting the bars in spaced relation at a median point, the bars lying in parallel planes and disposed diagonally to each other, one bar being welded to and connecting the lobes of one pair and the other bar being welded to and connecting the bars of the other pair.

8. A chain link comprising a closed wire loop with the ends thereof oppositely twisted to form a pair of diagonally opposed depressed lobes and a pair of diagonally opposed elevated lobes, and a bar welded to and connecting each pair of lobes to prevent them from spreading apart, one bar being welded to one face of the link and the other bar to the other face thereof.

9. A chain link comprising a closed wire loop with the ends thereof oppositely twisted to form a pair of diagonally opposed depressed lobes and a pair of diagonally opposed elevated lobes and a bar welded to and connecting each pair of lobes to prevent them from spreading apart, the points of connection of the bars to the lobes lying within the outer peripheries of the lobes.

JOHN R. REYBURN.